March 24, 1936.  G. W. STEDWELL  2,034,845
METERED LIQUID DISPENSING APPARATUS
Filed June 30, 1932  3 Sheets-Sheet 1
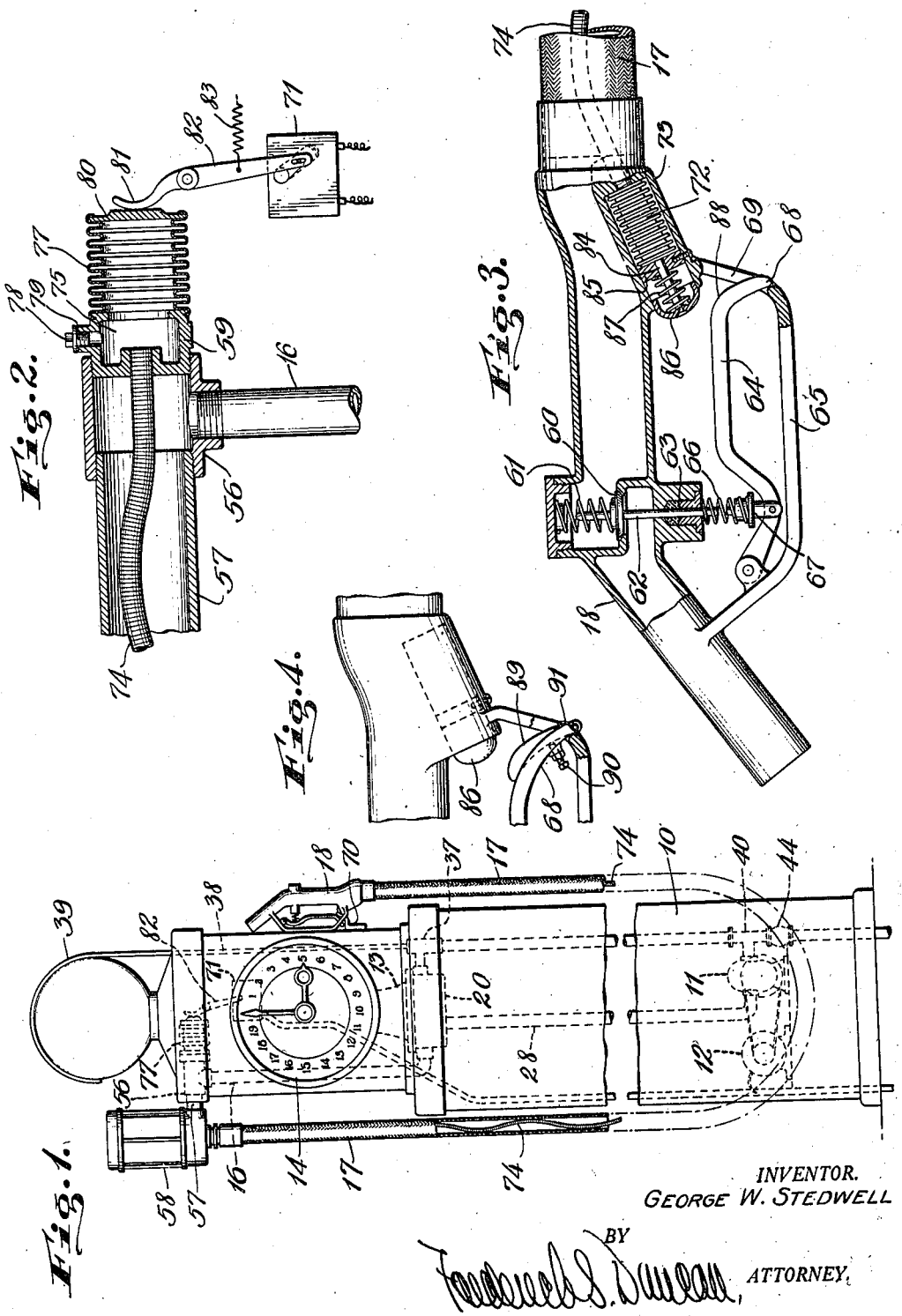
INVENTOR.
GEORGE W. STEDWELL
BY
Frederick S. Duncan, ATTORNEY.

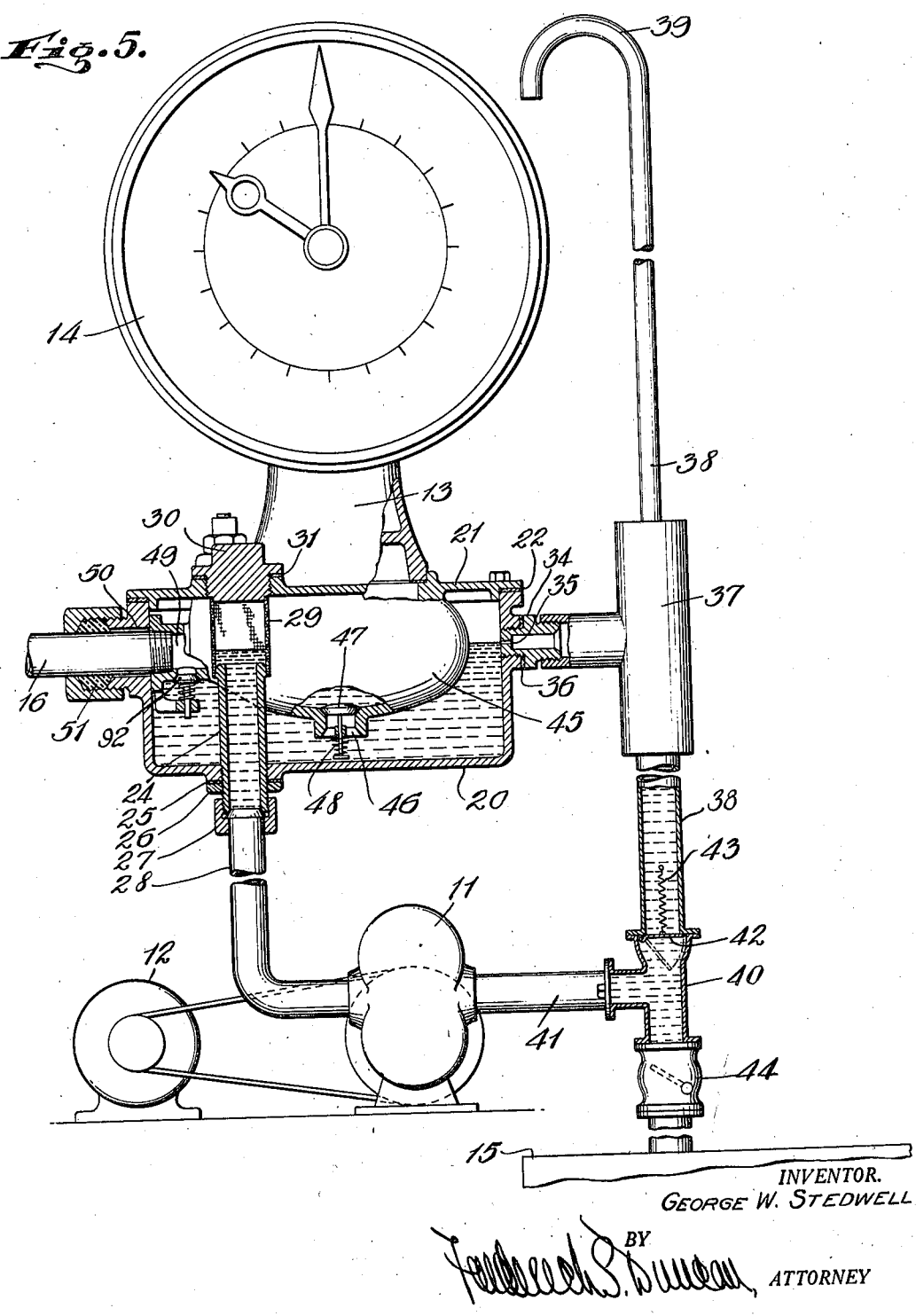

March 24, 1936. G. W. STEDWELL 2,034,845
METERED LIQUID DISPENSING APPARATUS
Filed June 30, 1932 3 Sheets-Sheet 3

Fig. 6.

INVENTOR.
GEORGE W. STEDWELL
BY
ATTORNEY

Patented Mar. 24, 1936

2,034,845

UNITED STATES PATENT OFFICE 2,034,845

METERED LIQUID DISPENSING APPARATUS

George W. Stedwell, Brooklyn, N. Y., assignor to Keystone Controls, Inc., New York, N. Y., a corporation of New York Application June 30, 1932, Serial No. 620,099

36 Claims. (Cl. 221—95)

The present invention relates to metered liquid dispensing apparatus and more particularly to the type of apparatus used at filling stations for dispensing liquid fuel to automotive vehicles.

An object of my invention is to insure accuracy of measure of the liquid dispensed.

In apparatus of this character as heretofore constructed inaccuracies of measure usually result from the presence of entrained air or vapor. It is, therefore, an object of the present invention to provide means for separating entrained gas from the liquid before it enters the meter. The term "gas" is used in its generic sense to distinguish from liquid and includes any gaseous matter, be it air or vapor.

Another object of the invention is to provide a separator and meter combined into a unitary structure.

Another object of the invention is to provide novel means for discharging the gas that has been separated from the liquid.

My invention has for a further object to insure substantially constant pressure in the liquid fed through the meter so as to overcome inaccuracies of metering that result from wide variations of pressure. To this end, I provide means for controlling the speed of the pump from the discharge nozzle of the delivery hose, the control being such that when the delivery valve in the nozzle is only partially open, the speed of the pump will be proportionately reduced and the pressure of liquid passing through the meter will be held substantially to normal.

Other objects will appear in the following description of a preferred embodiment of my invention and of certain modifications, and thereafter the novelty and scope of the invention will be pointed out in the claims.

In the accompanying drawings;

Figure 1 is a view in front elevation of a dispenser embodying my invention;

Fig. 2 is a detail view in front elevation and largely in section of a rheostat control for the driving motor of the dispenser;

Fig. 3 is a detail view in side elevation and partly in section of a hose nozzle and certain control mechanism associated therewith;

Fig. 4 is a detail view showing a modification of the nozzle control mechanism;

Fig. 5 is a view in front elevation and partly in section of a preferred form of separator and parts associated therewith; and Fig. 6 is a view in front elevation and partly in section of another form of separator together with a novel control for the motor.

In general my improved dispenser comprises a casing 10 within which is a pump 11 driven by a motor 12, and a meter 13 having a dial 14 which shows through a suitable opening in the casing. The pump draws liquid from a supply tank or reservoir 15 and forces the liquid through the meter into a delivery line 16 and thence to a delivery hose 17. The latter has a delivery nozzle 18 at its free end.

As shown in Fig. 5, the meter has a gas separator combined therewith. This separator comprises a tank 20 closed at the top by a lid 21. A gasket 22 under the lid provides an air seal for the tank. An inlet pipe 24 is threaded through the bottom of the tank and the threaded joint is suitably sealed by a gasket 25 and lock nut 26. The lower projecting end of the pipe 24 is connected by a suitable coupling 27 to a pipe 28 leading from the discharge port of the pump 11. The upper end of the pipe 24 enters a tubular filter or screen 29 in which it has a sliding fit. This screen is secured to a plug 30 which is screwed into an opening in the lid. A gasket 31 is fitted between the lid and a flange on the plug so as to insure an airtight seal. By this arrangement, whenever desired, the plug may be unscrewed to withdraw the screen so that it may be cleaned.

Screwed into one side of the tank and preferably remote from the screen 29, is a nipple 34 which has a very small orifice 35 therein. This nipple is also tightly sealed into the tank by screwing it therein against a gasket 36. The outer end of the nipple is screwed into a T-fitting 37 which forms part of a stand pipe 38. This stand pipe leads to the top of the dispenser and preferably terminates in a goose neck 39. At its lower end the stand pipe is connected by T-fitting 40 to the supply pipe 41 connecting the pump 11 with the tank 15. The fitting 40 is provided with a valve 42 which opens downwardly but is normally held in closed position by a spring 43 to prevent the pump from drawing air through the stand pipe 38. The valve is also normally sealed by liquid which overflows through the vent 35 into the stand pipe. The spring is strong enough to prevent the valve from being opened by suction of the pump until a predetermined head of liquid has accumulated in the stand pipe. Thus it requires both pump suction and liquid pressure to force the valve open. The accumulated liquid then flows out into the supply pipe until the head of the liquid has dropped sufficiently to enable the spring to close the valve.

It will be observed that the orifice 35 provides an open vent for the separator tank 20 and determines the normal level of liquid in the tank. When the pump is operated the liquid will accumulate in the tank because it is pumped thereinto much faster than it can flow out through the minute orifice 35, and the air trapped in the separator by the rise of the liquid level above the orifice 35, together with entrained gas that separates from the liquid in the tank, will exert pressure upon the liquid to force the latter through the meter to the hose.

It is desirable to maintain liquid in the separator up to the level of the vent 35 and also in the pipe line 28 and pump 11, and to prevent the liquid from draining away when the pump stops, a check valve 44, opening toward the pump, is provided in the supply line 41 below the fitting 40. The supply line preferably extends to the bottom of the reservoir 15 and is supplied with the usual foot valve (not shown). However, a foot valve cannot always be depended upon to hold the supply line full of liquid. Furthermore, leaks may develop in the supply line itself. Hence, I find it desirable to provide the check valve 44 near the intake port of the pump.

The particular meter shown in Fig. 5 is of the oscillating piston type and projects into the tank 20. The lid 21 may be an integral part of the meter housing 45 in which the oscillating piston operates. Liquid enters the meter through an intake port 46 in the bottom of the housing 45. A check valve 47, opening inwardly, normally closes this port. This valve is loaded by a spring 48 so that it will not yield until a predetermined fluid pressure has been developed in the tank 20.

The internal construction of the meter may be of standard type and forms no part of my invention. The meter is provided with an outlet port 49 into which is screwed pipe 16. The latter passes through an opening 50 in the side of the tank 20, and said opening is sealed against leakage by a stuffing box 51.

The delivery pipe 16 is provided at its outer end with a T-fitting 56 (Fig. 2), one lateral arm of which is connected by a short length of pipe 57 to an indicating gage 58. The opposite arm is closed by a plug 59, as will be explained presently.

The hose 17 is connected at one end thereof to the gage 58. The nozzle 18 at the other end of the hose is provided with a delivery valve 60, as shown in Fig. 3. This valve opens inwardly and is normally held in closed position by a spring 61. The stem 62 of the valve 60 passes out of the nozzle through a stuffing box 63 in position to be operated by a control lever 64. A button 67 pivoted on the lever 64, is held in alinement with the stem 62 by a coil spring 66 which encircles the stem and is compressed between the stuffing box and a flange on the button 67. A certain amount of clearance is provided between the stem and the button so that the control lever may be moved through an appreciable angle before starting to open the valve 60. The purpose of this lost motion will appear presently. The spring 66 aside from holding the button in alinement with the stem serves to prevent chatter of the valve when it is slightly opened.

The control lever 64 is protected by a guard 65 in the usual manner and the free end 68 of the lever projects through a slot in the guard 65. The nozzle is normally supported on a hook 70 which has a lug adapted to project through the slot 69 in such position as to engage the lever end 68 and prevent opening of the nozzle valve while the nozzle is on the hook.

A rheostat 71 (Fig. 2) is provided in the motor circuit. This rheostat is controlled from the nozzle by means of a hydraulic actuating system. The latter comprises a bellows element 72 (Fig. 3) which is fitted within a suitable casing 73 in the nozzle. A flexible tube 74 leads from the inner end of the bellows and extends through the hose, terminating at its opposite end in a chamber 75 formed in the plug 59. Fixed to the plug and communicating with this chamber is a bellows 77. A filler port is provided for the chamber 75, said port being normally closed by screw plug 78 and gasket 79. A suitable liquid is introduced through the filler port completely to fill the two bellows and the connecting tube 74.

It will be observed that the tube 74 is longer than the hose, being spiralled or looped therein so that there is considerable slack in the tube under normal conditions, as shown in Fig. 1. The purpose of this is to provide for stretch of the hose in service and prevent undue strain on the tube.

The outer end of the bellows 77 is closed by a bearing plate 80 against which bears one arm 81 of a lever 82. The other arm of the lever has pin-and-slot connection to the switch arm of the rheostat 71. A spring 83 presses the arm 81 against the plate 80.

The bellows 72 at the nozzle is closed at its outer end and has a stem 84 which projects through a diaphragm 85 fixed in the casing 73. The stem 84 is provided at its outer end with a rounded cap 86. A spring 87 fitted between the cap and the diaphragm holds the bellows 72 normally in expanded condition and also presses the cap outwardly in position to be engaged by a cam surface 88 on the end 68 of the control lever.

The normal spacing between valve stem 62 and button 67 is such that when the lever 64 is pressed the cam surface 88 will engage the cap 86 and compress the bellows 72 before starting to open valve 60. Compression of bellows 72 will cause expansion of the bellows 77 at the opposite end of the system and will operate the rheostat to start the motor. The parts are so proportioned that the motor will not be driven at full speed unless the delivery valve 60 is wide open and as the valve is partially closed the resistance in the motor circuit will be increased in substantial proportion, thereby insuring a substantially constant liquid pressure through the motor and hose.

A slightly modified form of the rheostat control at the nozzle is shown in Fig. 4. Here the control lever is provided with an adjustable cam 89 adapted to engage the cap 86. The cam 89 is pivoted upon the end 68 of the control lever and a screw 90 in the part 68 may be adjusted to force the cam outwardly against the pressure of a spring 91.

By this means the operation of the rheostat with respect to the opening of the nozzle valve may be regulated as desired.

The operation of the apparatus as so far described is as follows: When the operator desires to dispense liquid from the tank 15 he removes the nozzle 18 from the support 70 and then presses the control lever 64, thereby first starting the motor by depressing the cap 86 and then by further movement of the control lever, opening the nozzle valve 60. The motor drives the pump which then draws liquid from the supply line 41 and delivers it through the screen 29 into the separator tank 20. In passing through the screen 29 the liquid is not only filtered but is also subdivided into small streams, thus facilitating the liberation of entrained gas. When the apparatus is first started with the tank 20 empty the entrained gas liberated from the liquid and the air in the tank displaced by the liquid will escape through the vent 35 and thence out of the stand pipe 38, but as the liquid accumulates in the tank 20 it will cover the vent 35, trapping the gas in the tank above the level of said vent. The pump 11 forces liquid into the tank at such a rate that despite the constantly open vent 35 a considerable pressure is developed in the tank 20 and as soon as this pressure is sufficient to overcome the spring 48, the liquid will discharge through the meter into the delivery pipe 16 and thence through the hose and out of the nozzle 18.

As the entrained air and vapor accumulates in the tank 20 it will force the liquid level downward. Under extreme conditions the level might be lowered sufficiently for the gas to blow out of the tank through the vent. This would cause a sudden lowering of pressure, but the spring loaded valve 47 would then close immediately and prevent the surge from affecting the meter. However, the capacity of the tank 20 is more than sufficient to take care of all the gas that would collect under normal conditions since between dispensing operations the liquid level would gradually settle until the vent 35 was uncovered and the gas could escape. As long as the vent 35 is submerged, there will be a discharge of liquid through the vent but in so fine a stream as not materially to affect pressure conditions in the tank while the pump is running. The liquid thus discharged will accumulate in the stand pipe until it builds up a sufficient head upon the valve 42 to overcome the pull of spring 43, open said valve and discharge into the supply line 41. However, such discharge will only take place while the pump is exerting suction in the supply line, and the valve will close before the accumulated liquid is entirely discharged so that there will always be a certain quantity of liquid overlying the valve to seal the same against leakage of air from the stand pipe into the supply line.

When the hose is on the hook the system remains filled with liquid except that the level in the tank is gradually lowered by discharge through the vent 35 until the liquid level drops to the level of said vent. Then any accumulation of gas in the tank escapes and the pressure in the tank drops to atmospheric pressure. However, the liquid in the hose, delivery line and meter cannot escape because of the check valve 47. To allow for expansion due to wide variations of temperature, a pressure relief valve 92 is provided in the discharge port of the meter. This valve is spring-loaded to open at a pressure considerably higher than that required for dispensing of the liquid so that when for any reason the liquid expands in the hose and delivery pipe line a portion of the liquid may escape through the valve 92 into the tank 20 and relieve the pressure.

In the modified form of apparatus shown in Fig. 6, the meter may be remote from the main separator tank if desired. An auxiliary tank is also provided and interlocking valves connect the main tank to the auxiliary tank and the latter to a stand pipe.

The main supply reservoir 100 is connected by a supply line 101 to the intake port of a pump 102. The latter is driven by a motor 103. From the discharge port of the pump a pipe 104 leads into the main separator tank 105. Connecting pipes 101 and 104 is a by-pass pipe 106 provided with a spring-loaded valve 107 which controls the pressure of the liquid delivered by the pump 102 to the separator tank 105. Below the by-pass pipe 106, the supply line 101 is provided with a check valve 108 which opens toward the pump 102. The supply line extends into the tank 100 to a point near the bottom thereof and is provided with the usual foot valve (not shown).

The pipe 104 passes through a stuffing box 110 at the bottom of the separator tank 105 and extends into the separator tank to a point near the upper end thereof, where it enters a tubular screen 111 fixed to and depending from a plug 112. The latter is screwed into an opening into the top of the separator tank and is sealed against air leakage by gasket 113. Near the bottom of the tank 105 there is an outlet port from which leads a pipe 114 to the meter 115. From the discharge end of the meter a delivery pipe 116 leads to the hose (not shown). A branch pipe 117 leads from pipe 114 into the tank 105. Normally this branch pipe is closed by a spring-loaded check valve 118 opening toward the tank. Another check valve 119 in the pipe 114 opens toward the meter.

The auxiliary tank 120 is smaller than the tank 105 and is situated to one side and above the main tank. A passage 121 connects the two tanks, such passage running from a point at or near the top of tank 105 to the bottom of the tank 120. In this passage there is a rotary plug valve 122.

The tank 120 is closed at the top by a lid 123 which is securely bolted fast and a gasket 124 between the lid and the tank insures an air seal. The lid 123 is formed with a discharge nozzle 125 into which is screwed the lower end of a stand pipe 126. The latter leads to a convenient high point and preferably terminates in a goose neck, as shown. In the discharge nozzle 124 there is a rotary plug valve 127.

In this particular embodiment of my invention, the hose nozzle is not supported on a fixed hook but on a pivoted hose hook 128 of the type generally known in the art as a "telephone hook". The hook 128 is pivoted on a stud 129 and has a depending arm 130. This arm has pin-and-slot connection 131 with a switch lever 132 projecting from a switch box 133. The switch controls the circuit of the motor 103.

When the hose nozzle is supported on the hook 128 the weight of the nozzle will hold the hook in the position shown by broken lines in Fig. 6 and the switch lever 132 will then be in the off position. A spring 135 connects the arm 130 and lever 132 and assists in holding the arm 128 in depressed position and the switch arm 132 in off position. When the hose is removed from the hook, the arm 128 must be manually pushed up to the position shown in full lines in order to start the motor. When this occurs the axis of the spring 135 will be moved past the pivot of lever 132 and will tend to hold the lever 128 in raised position, as shown in full lines. However, the weight of the hose nozzle when applied to the hook will be sufficient to trip the levers and move them to the position shown by broken lines in Fig. 6.

The valve 122 is provided with an operating arm 136 which is connected by a link 137 to the hose hook 128. Similarly the valve 127 is provided with an operating arm 138 which is connected by a link 139 to the hose hook 128. However, in order to delay the action of the valves with respect to the switch arm, the links 137 and 139 are each provided with a pin-and-slot connection with the hose hook, and the slots are so relatively proportioned that there is a greater delay in the case of the valve 127 than in that of valve 122. Thus, when hose hook 128 is lowered by hanging the nozzle thereon, the motor switch will open first, then the valve 122 will open and finally the valve 127 will open.

The operation of the apparatus is as follows: Normally when the hose nozzle is hung upon the hook 128 the latter will assume the position shown in broken lines in Fig. 6, with both of the valves 122 and 127 open and the motor circuit open. This position of the valves and switch will be maintained until the hook is raised manually, to start the motor and close the valves. The pump then operates to draw liquid from the tank 100 and deliver it to the separator tank 105, the by-pass 106 and spring-loaded valve 107 serving to prevent excess pressure of the liquid delivered to the tank 105. The liquid pumped into the separator tank discharges through the tubular screen 111 and any gas that may be entrained in the liquid separates therefrom and accumulates in the top of the main tank 105. This gas, if there be any, is merely compressed in the top of the tank since it cannot escape by way of valve 122. The liquid in the tank is forced past the check valve 119 through the meter 115 and thence by way of the delivery pipe 116 to the hose. In the meantime, the check valve 118 will remain on its seat because the pressure in the tank 105 is greater than or at least as great as that of the liquid flowing through the meter 115. Furthermore, the spring-loading on the valve will assist in holding it in its seat.

The tank 105 is large enough to retain all the gases that may separate out from the liquid during the filling of a motor vehicle tank of maximum size. After the dispensing is completed the hose nozzle is hung on the hook 128 and the weight of the nozzle swings the hook down to the position shown in broken lines. This results in first turning off the motor, then opening the valves 122 and 127. However, the valve 122 will open before the valve 127 and the gas in the tank 105 will discharge into the tank 120. Owing to the pressure under which this gas is retained in the tank 105 it will discharge into the auxiliary tank 120 with a sudden burst and may carry a certain amount of liquid with it. This pressure, however, is relieved as soon as the vapor enters the tank 120 and such relief takes place before the valve 127 is opened, hence, the discharge from the tank 120 through the stand pipe 126 to atmosphere will be comparatively slow and under low pressure. As a result, any liquid which might be blown from tank 105 to the tank 120 will separate from the vapor in the latter tank and will then pour down the passage 121 through the open valve 122 back into the tank 105. Thus, the auxiliary or expansion tank 120 takes care of any high pressure that might be developed in the tank 105 and acts as a further separator of gas from the liquid, so that no liquid will be discharged from the stand pipe 126.

Since the tanks 105 and 120 are open to atmospheric pressure through valves 122 and 127 when the dispenser is not operating, it is desirable to provide some means for preventing drainage of liquid from the meter 115 back into the tank 105. It is for this reason that the check valve 119 is provided. Thus, after the apparatus is once operated the meter 115 as well as the hose will be full of liquid, it being understood that the hose is provided with the usual normally closed and manually opened discharge valve at the nozzle. The check valve 118 serves to take care of pressure in the hose and meter which might develop as a result of a rise in atmospheric temperature. This check valve, as explained above, is spring-loaded so that normally it will retain the liquid in the meter and hose, but it will yield and permit discharge of a certain portion of the liquid from the meter and hose into the tank 105 when the liquid is expanded by thermal conditions.

It will be understood that the embodiments described above are to be taken as illustrative and not limitative of my invention and that I reserve the right to make various changes in form, construction and arrangement of parts without departing from the spirit and scope of the following claims.

I claim:

1. In an apparatus of the character described, a meter, a delivery line, a pump for delivering liquid under pressure through the meter into said line, a motor for driving the pump, a normally closed discharge valve for the delivery line, a manually operable device for opening said valve, and means actuated by said device for controlling the speed of said motor.

2. In an apparatus of the character described, a meter, a delivery line, a pump for delivering liquid under pressure through the meter into said line, a motor for driving the pump, a manually operable discharge valve for said delivery line, and means for varying the speed of the motor substantially in proportion to the opening of said valve.

3. In an apparatus of the character described, a meter, a delivery line including a discharge nozzle, a pump for delivering liquid under pressure through the meter into said line, a motor for driving the pump, an energizing circuit therefor, a rheostat controlling said circuit, and means controlled from the discharge nozzle for operating said rheostat.

4. In an apparatus of the character described, a meter, a delivery line, a pump for delivering liquid under pressure through the meter into said line, a motor for driving the pump, an energizing circuit therefor, a rheostat controlling said circuit, a normally closed discharge valve for the delivery line, a manually operable device for opening said valve, and means controlled by said device for operating said rheostat.

5. In an apparatus of the character described, a meter, a delivery line, a pump for delivering liquid under pressure through the meter into said line, a motor for driving the pump, an energizing circuit therefor, a rheostat controlling said circuit, a normally closed discharge valve for the delivery line, a manually operable device for opening said valve, and means controlled by said device for operating said rheostat in timed relation to the opening of said valve.

6. In an apparatus of the character described, a meter, a delivery line, a pump for delivering liquid under pressure through the meter into said line, a motor for driving a pump, an energizing circuit therefor, a rheostat controlling said circuit, a normally closed discharge valve for the delivery line, a manually operable device for opening said valve, means controlled by said device for operating said rheostat, the last mentioned means including an adjustable device for timing the operation of the rheostat with respect to the opening of the valve.

7. In an apparatus of the character described, a separator, a meter, a delivery line including a normally closed manually operable discharge valve for said line, means for delivering liquid under pressure through the separator into the meter and thence into said line, a check valve for preventing return of liquid from the meter into the separator, and a pressure relief valve adapted to permit return of the liquid into said separator when the pressure in said line exceeds that in the separator by a predetermined amount.

8. In an apparatus of the character described, a separator tank, a delivery line leading out of the tank and having a manually operable normally closed discharge valve, means for introducing liquid under pressure into said tank, and valve means responsive to relative pressures in said tank and said delivery line for controlling transfer of liquid in either direction therebetween, said valve means preventing liquid flow from the tank into the line unless the pressure in the tank exceeds that in the line by a predetermined amount and preventing return flow from the line into the tank unless the pressure in the line exceeds that in the tank by a predetermined amount.

9. In an apparatus of the character described, a separator, a delivery line leading out of the separator and having a manually operable normally closed discharge valve, means for introducing liquid under pressure into said separator, valve means responsive to relative pressure in said separator and said line for controlling transfer of liquid in either direction therebetween, said valve means preventing liquid flow from the separator into the line unless the pressure in the separator exceeds that in the line by a predetermined amount and preventing return flow from the line into the separator unless the pressure in the line exceeds that in the separator by a predetermined amount, and means for measuring the liquid flowing from the separator into the delivery line.

10. In an apparatus of the character described, a separator, a meter, a delivery line including a normally closed manually operable discharge valve therefor, means for delivering liquid under pressure through the separator into the meter and thence into said line, a check valve for preventing return of liquid from the meter into the separator, a by-pass from the delivery line into the separator, and a pressure relief valve in said by-pass adapted to permit return of the liquid into the separator when the pressure in said line exceeds that in the separator by a predetermined amount.

11. In an apparatus of the character described, a separator, a meter, a delivery line including a normally closed manually operable discharge valve for said line, means for delivering liquid under pressure through the separator into the meter and thence into said line, and means permitting return of liquid from the line directly into the separator, only when the pressure in the line exceeds that in the separator by a predetermined amount.

12. A combined meter and gas separator for a liquid dispensing system, comprising, a meter, a sealed tank surrounding the meter and providing a gas separator chamber therebetween, an inlet port for introducing liquid under pressure into the chamber, and an intake port for the meter near the bottom of the tank, the tank having a restricted vent above the level of said intake port.

13. A combined meter and gas separator for a liquid dispensing system, comprising, a meter, a tank surrounding the meter and sealed thereto and providing a gas separating chamber therebetween, an inlet port for introducing liquid under pressure into the chamber, and an intake port for the meter near the bottom of the tank, the tank having a restricted but constantly open vent above the level of said intake port.

14. In a liquid dispensing apparatus, a main separator tank, an auxiliary tank, a restricted passageway connecting the tanks, a pump adapted to deliver liquid under pressure into the main tank, the latter having an outlet delivery port below the level of the mouth of said passageway, said auxiliary tank having an outlet for the discharge of gas and a liquid discharge port connected to the suction side of the pump, and a valve normally closing the liquid discharge port but adapted to open in response to a predetermined difference of fluid pressure on opposite sides of the valve.

15. In a liquid dispensing apparatus, a main separator tank, an auxiliary tank, a restricted passageway connecting the tanks, a pump adapted to deliver liquid under pressure into the main tank, the latter having an outlet delivery port below the level of the mouth of said passageway, said auxiliary tank having an outlet for the discharge of gas and a liquid discharge port connected to the suction side of the pump, a valve in the discharge port opening toward the pump, and a spring adapted to keep the valve normally closed but yieldable to a predetermined pressure on the valve to permit a discharge of liquid from the auxiliary tank.

16. In a liquid dispensing apparatus comprising a delivery line and a pump for delivering liquid under pressure into said line, a main separator tank interposed between the pump and the line, an auxiliary tank at a higher level than the main tank, a passageway leading upward from the main tank to the auxiliary tank, a valve controlling said passageway, the auxiliary tank having a gas vent, a valve controlling said vent, a controller for opening and closing said valves, including a timing means whereby opening of the passageway valve will precede opening of the vent valve.

17. In a liquid dispensing apparatus comprising a delivery line and a pump for delivering liquid under pressure into said line, a main separator tank interposed between the pump and said line, an auxiliary tank at a higher level than the main tank, a passageway leading upward from the main tank to the auxiliary tank, a valve controlling said passageway, the auxiliary tank having a gas vent, a valve controlling said vent, a controller for starting and stopping the pump, and valve operating means interconnecting said valves and said controller for closing the valves in timed relation to the starting of the pump and opening the valves in timed relation to stopping the pump.

18. In a liquid dispensing apparatus comprising a delivery line and a pump for delivering liquid under pressure into said line, a main separator tank interposed between the pump and the line, an auxiliary tank at a higher level than the main tank, a passageway leading upward from the main tank to the auxiliary tank, a valve controlling said passageway, the auxiliary tank having a gas vent, a valve controlling said vent, a controller for starting and stopping the pump, and valve operating means interconnecting said valves and said controller for closing the valves in timed relation to the starting of the pump and opening the valves in timed relation to stopping the pump, said means including a lost motion connection whereby the pump will be stopped before said valves are opened.

19. In a liquid dispensing apparatus comprising a delivery line and a pump for delivering liquid under pressure into said line, a main separator tank interposed between the pump and the line, an auxiliary tank at a higher level than the main tank, a passageway leading upward from the main tank to the auxiliary tank, a valve controlling said passageway, the auxiliary tank having a gas vent, a valve controlling said vent, a controller for starting and stopping the pump, and valve operating means interconnecting said valves and said controller for closing the valves in timed relation to the starting of the pump and opening the valves in timed relation to stopping the pump, said means including a lost motion connection whereby the passageway valve will be opened after the pump has stopped and the gas valve will be opened after the passageway valve has opened.

20. In a liquid dispensing apparatus, a main separator tank, a delivery line including a discharge nozzle, a pump for delivering liquid under pressure into the separator tank and thence into the delivery line, a movable support for the discharge nozzle and adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, and means interconnecting said valves with said movable support whereby when the support is depressed the valves will be opened.

21. In a liquid dispensing apparatus, a main separator tank, a delivery line including a discharge nozzle, a pump for delivering liquid under pressure into the separator tank and thence into the delivery line, a movable support for the discharge nozzle and adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, and means interconnecting said valves with said movable support whereby when the support is depressed the valves will be opened, said means including a loose connection whereby opening of the passageway valve will precede opening of the vent valve.

22. In a liquid dispensing apparatus, a main separator tank, a delivery line including a discharge nozzle, a pump for delivering liquid under pressure into the separator tank and thence into the delivery line, a movable support for the discharge nozzle and adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, means interconnecting said valves with said movable support whereby when the support is depressed the valves will be opened, a motor for driving the pump, an energizing circuit for the motor including a switch, and means connecting said switch and support whereby the switch will be opened when the support is depressed.

23. In a liquid dispensing apparatus, a main separator tank, a delivery line including a discharge nozzle, a pump for delivering liquid under pressure into the separator tank and thence into the delivery line, a movable support for the discharge nozzle adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, means interconnecting said valves with said movable support whereby when the support is depressed the valves will be opened, a motor for driving the pump, an energizing circuit for the motor including a switch, means connecting said switch and support whereby the switch will be opened when the support is depressed, and means tending to hold the support in either depressed or raised position.

24. In a liquid dispensing apparatus, a main separator tank, a delivery line including a discharge nozzle, a pump for delivering liquid under pressure into the separator tank and thence into the delivery line, a movable support for the discharge nozzle adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, means connecting said valves with said movable support whereby when the support is depressed the valves will be opened, a motor for driving the pump, an energizing circuit for the motor including a switch, and means connecting said switch and support whereby the switch will be opened when the support is depressed, the switch and valve connections to the support being so interrelated that the switch will open before the valves are opened.

25. In a liquid dispensing apparatus, a main separator tank, a delivery line including a discharge nozzle, a pump for delivering liquid under pressure into the separator tank and thence into the delivery line, a movable support for the discharge nozzle adapted to be depressed by the weight of said nozzle, an auxiliary tank at a higher level than the main separator tank, a passageway leading upward from the main tank to the auxiliary tank, a valve controlling said passageway, the auxiliary tank having a gas vent, a valve controlling said vent, means connecting said valves with said movable support whereby when the support is depressed the valves will be opened, a motor for driving the pump, an energizing circuit for the motor including a switch, and means connecting said switch and support whereby the switch will be opened when the support is depressed, the switch and valve connections to the support being so interrelated that the switch will open before the passageway valve is opened and the latter will open before the vent valve is opened.

26. In a liquid dispensing apparatus, a separator tank, a delivery line including a discharge nozzle, a pump for delivering liquid under pressure into the pressure tank and thence into the delivery line, a movable support for the nozzle when not in use, said support being adapted to be depressed by the weight of said nozzle, said tank having a gas vent, a valve controlling said vent, and means operatively connecting said valve and said support whereby the valve will be opened when the support is depressed.

27. A combined meter and gas separator for a liquid dispensing system, a meter, a sealed tank surrounding the meter and providing a gas separating chamber therebetween, an inlet port for introducing liquid under pressure into the chamber, an intake port for the meter near the bottom of the tank, and means for discharging gas from the tank.

28. In a liquid dispensing apparatus, a main separator tank, a delivery line including a discharge nozzle, a pump for delivering liquid under pressure into the separator tank and thence into the delivery line, a movable support for the discharge nozzle and adapted to be depressed by the weight of said nozzle, an auxiliary tank at a higher level than the main separator tank, means for discharging gas from the main tank into the auxiliary tank, the latter having a gas vent, a valve controlling said vent, and means connecting said valve and said support whereby when the support is depressed the valve will be opened.

29. In combination a pump operable at will to deliver liquid under pressure, a delivery line for the liquid, a meter for measuring the liquid delivered to said line, a separator between the pump and the meter for separating from the liquid any gas that may be entrained therein, means providing a normally closed vent for said gas, and means for opening said vent after each operation of the pump.

30. In combination a pump for delivering liquid under pressure, a controller for starting and stopping the pump, a delivery line for the liquid, a meter for measuring the liquid delivered to said line, a separator between the pump and the meter for separating from the liquid any gas that may be entrained therein, and means controlled by said controller for venting the gas from the separator.

31. In a liquid dispensing apparatus, a delivery line including a discharge nozzle, a pump constructed and arranged to deliver liquid under pressure into the delivery line, said delivery line including an expansion chamber and a meter constructed and arranged to meter said liquid, and valve means constructed and arranged to permit the liquid to flow forward freely out of said chamber toward the nozzle and prevent return flow into the chamber but yieldable to permit return of the liquid into said chamber when the pressure in the line forward of the chamber exceeds that in the chamber by a predetermined amount.

32. In a liquid dispensing apparatus, a delivery line including a discharge nozzle having a manually operable valve, a pump constructed and arranged to deliver liquid under pressure into said line, said line including a meter for measuring liquid flow therethrough to the nozzle, and means for by-passing return flow around the meter when the pressure in said line on the nozzle side of the meter exceeds that on the pump side of the meter.

33. In a liquid dispensing apparatus, a delivery line including a discharge nozzle having a manually operable valve, a pump constructed and arranged to deliver liquid under pressure into said line, said line including a meter for measuring liquid flow therethrough to the nozzle, a by-pass around the meter and valve means preventing flow through the by-pass to the nozzle and preventing return flow from the nozzle through the meter.

34. In a liquid dispensing apparatus, a delivery line including a discharge nozzle having a manually operable valve, a pump constructed and arranged to deliver liquid under pressure into said line, said line including a meter for measuring liquid flow therethrough to the nozzle and a by-pass around the meter, a check valve in the meter opening toward the nozzle, and a check valve in the by-pass opening toward the pump.

35. In a liquid dispensing apparatus, a delivery line including a flexible hose terminated at its free end in a discharge nozzle, means for delivering liquid under pressure to said line, a controller operable to start and stop said delivery means, a manually operable valve on the nozzle for controlling the discharge of said liquid therefrom, said delivery line including a meter for measuring the flow of liquid through the line and including also a reservoir having a vent, a valve controlling said vent, and operating means interconnecting said delivery controller and said vent controlling valve whereby the vent will be closed when the delivery means is started and will be opened when the delivery means is stopped.

36. In a liquid dispensing apparatus, a delivery line including a flexible hose terminated at its free end in a discharge nozzle, a pump for delivering liquid under pressure to said line, an electric motor for driving the pump, means for supplying the motor with power including a control switch having a switch arm, a manually operable valve on the nozzle for controlling the discharge of said liquid therefrom, said delivery line including a meter for measuring the flow of liquid through the line and including also a reservoir having a vent, a valve controlling said vent, an operating lever for the valve and means operatively interconnecting said switch arm and said lever for conjointly opening and closing the vent and switch, said interconnecting means including a lost motion connection to delay the operation of the valve lever with respect to said switch arm.

GEORGE W. STEDWELL.